United States Patent [19]
Opoczynski

[11] Patent Number: 5,408,462
[45] Date of Patent: Apr. 18, 1995

[54] PROTECTION SWITCHING APPARATUS AND METHOD

[75] Inventor: Adam Opoczynski, Eden Prairie, Minn.

[73] Assignee: ADC Telecommunications, Inc., Minneapolis, Minn.

[21] Appl. No.: 133,741

[22] Filed: Oct. 7, 1993

[51] Int. Cl.⁶ .......................... H04L 1/22; H04J 1/16; H04J 3/14
[52] U.S. Cl. .................................... 370/16; 340/827; 371/8.2
[58] Field of Search ................ 370/16, 16.1; 311/8.1, 311/8.2, 11.1, 11.2; 340/825.01, 825.03, 827; 379/221

[56] References Cited

U.S. PATENT DOCUMENTS

| | | | |
|---|---|---|---|
| 4,245,340 | 1/1981 | Landry | 370/111 |
| 4,395,780 | 7/1983 | Gohm et al. | 359/125 |
| 4,441,180 | 4/1984 | Schussler | 359/123 |
| 4,484,218 | 11/1984 | Boland et al. | 348/7 |
| 4,491,983 | 1/1985 | Pinnow et al. | 359/118 |
| 4,506,387 | 3/1985 | Walter | 359/118 |
| 4,545,048 | 10/1985 | Hauk et al. | 359/115 |
| 4,574,305 | 3/1986 | Campbell et al. | 348/12 |
| 4,686,667 | 8/1987 | Ohnsorge | 359/137 |
| 4,700,348 | 10/1987 | Ise et al. | 370/16 |
| 4,705,350 | 11/1987 | Cheng | 359/238 |
| 4,734,764 | 3/1988 | Pocock et al. | 348/7 |
| 4,774,703 | 9/1988 | Force et al. | 370/16 |
| 4,831,617 | 5/1989 | Iwasaki | 370/16 |
| 4,977,593 | 12/1990 | Ballance | 380/2 |
| 5,063,595 | 11/1991 | Ballance | 380/48 |
| 5,086,470 | 2/1992 | Ballance | 380/48 |
| 5,111,497 | 5/1992 | Bliven et al. | 379/27 |
| 5,136,411 | 8/1992 | Paik et al. | 359/125 |
| 5,142,532 | 8/1992 | Adams | 370/94.1 |
| 5,193,086 | 3/1993 | Satomi et al. | 370/16 |

FOREIGN PATENT DOCUMENTS

| | | |
|---|---|---|
| 1204230 | 5/1986 | Canada . |
| 2002295 | 5/1990 | Canada . |
| 0308150A1 | 3/1989 | European Pat. Off. . |
| 0318333A1 | 5/1989 | European Pat. Off. . |
| 0382431A1 | 8/1990 | European Pat. Off. . |
| 0411597A2 | 2/1991 | European Pat. Off. . |
| 0425732A1 | 5/1991 | European Pat. Off. . |
| 0472824A1 | 3/1992 | European Pat. Off. . |
| 3403206A1 | 1/1984 | Germany . |
| 2172165 | 9/1986 | United Kingdom . |
| 88/05233 | 7/1988 | WIPO . |
| 88/09093 | 11/1988 | WIPO . |
| 89/05070 | 6/1989 | WIPO . |
| 90/14733 | 11/1990 | WIPO . |
| 90/14734 | 11/1990 | WIPO . |

OTHER PUBLICATIONS

Lightwave Systems in the Subscriber Loop. Single-mode fibers and coherent transmission have become the focal point of research in subscriber-access systems. M. Gawdun.

Economic FO System for New Residential Services. Neal C. Hightower. Telephony Mar. 17, 1986.

The Provision of Telephony Over Passive Optical Networks. C E Hoppitt and D E A Clarke. Br. Telecom Technol—vol. 7, No. 2—Apr. 1989.

(List continued on next page.)

*Primary Examiner*—Douglas W. Olms
*Assistant Examiner*—Hassan Kizou
*Attorney, Agent, or Firm*—Schwegman, Lundberg & Woessner

[57] ABSTRACT

A protection switching system is disclosed which includes a plurality of telecommunications modules for processing and/or switching telecommunications signals. A first module provides signals to one pair of modules, which are in turn connected to another pair of modules. Each pair of modules includes a working and a standby module. The standby module controls the switching of all the modules in the system which require switching in the event that the standby module is activated. A controller monitor circuit monitors the faults present on the working modules and, if a fault is detected, signals the corresponding standby module, which in turn provides the protection switching.

1 Claim, 3 Drawing Sheets

OTHER PUBLICATIONS

Das BIGFON-Systemkonzept ASnforderungen and Aufgabenstellung. Wolfgang Schmidt. Nachrichtentechnische Berichte. Heft 1 Mai 1984.

Advanced Optical Technologies for the future Local Network. A. M. Hill, J. R. Stem, British Telecom Research Laboratories, Ipswich, UK. E-FOC 89. 111-115. Mar. 17, 1986.

Passive Optical Networks for the Subscriber Loop. Howard L. Lemberg. Bellcore.

Low-cost Digital Passive Optical Networks. A. R. J. Cook, D. W. Faulkner, P. J. Smith, R. A. Lobbett. British Teleom Ressearch Laboratories, Martlesham Heath, U.K.

Special Report: Operational Support Systems. OSS: A Must for fiber to the Curb. To Become a dpolyable volume product, any FTTC system needs to be automated via an operational support system. Jul. 15, 1990/TE&M.

Star-structed optical local networks. J. R. Fox and E. J. Boswell. Fulcrum.

5,408,462

PROTECTION SWITCHING APPARATUS AND METHOD

TECHNICAL FIELD OF THE INVENTION

The present invention pertains to protection switching in a telecommunication system.

BACKGROUND OF THE INVENTION

Telecommunication and other systems sometimes require that backup equipment be switched into operation within a short period of time after a failure is detected in the primary equipment.

SUMMARY OF THE INVENTION

The present invention provides apparatus and method for rapidly switching backup equipment into operation. According to the invention, a controller/monitor processor monitors the status of a plurality of telecommunications circuit module pairs, each pair having a working module and a standby module. Each standby module includes means operative upon a signal from the processor for switching all other module inputs in the system which require reconfiguration due to the activation of the standby module.

DETAILED DESCRIPTION OF THE INVENTION

Figure 1:
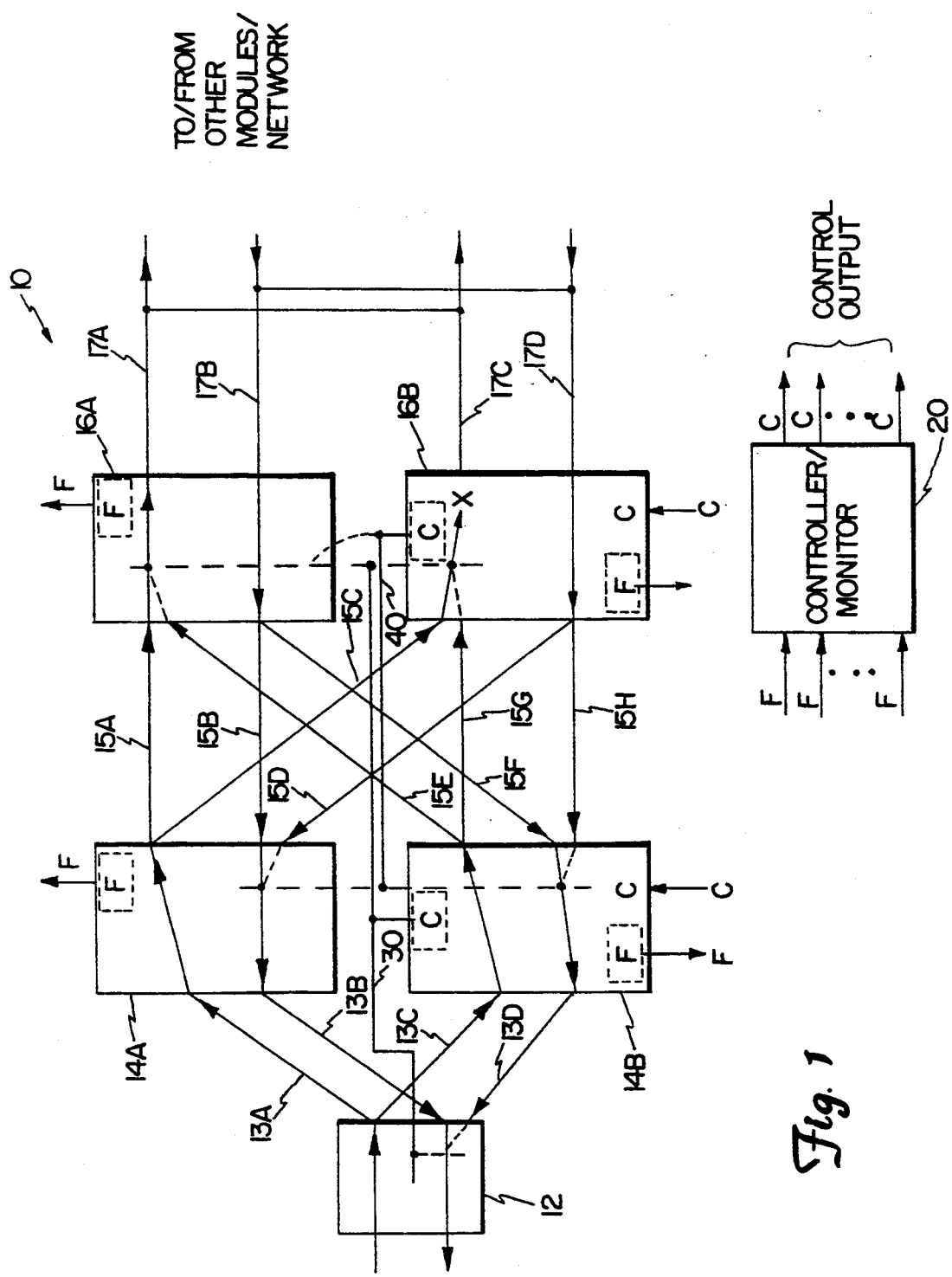
FIG. 1 is a simplified block diagram of the protection switching system of the present invention.

Referring now to FIG. 1, the protection switching system of the present invention is illustrated. System 10 is illustrated in a telecommunications system, wherein a first telecommunications module 12 is connected to a pair of modules 14A and 14B. 14A is the working module, and normally is connected to module 12 such that module 12 conveys signals along path 13A to module 14A and such that module 12 receives signals along path 13B from module 14A. Paths 13A and 13B, as in the case of all other paths in the system, may comprise, for example, an electronic circuit connection, a wired connection, or a fiber optic connection. Module 14B serves as a backup to module 14A.

A further pair of modules 16A and 16B are connected to modules 14A and 14B. Module 16A serves as the working module, with module 16B as the standby. In normal operation, module 16A receives signals from module 14A along path 15A. Module 16A provides signals back to module 14A along path 15B. Module 16A outputs signals along path 17A and receives signals along path 17B. Paths 17A and 17B may be connected to other equipment or to a telecommunications network.

Each of modules 12, 14A, 14B, 16A and 16B are simplified representations of electronic circuit modules which receive signals and process and/or switch those signals. The function of a module is not important to the invention. The modules transmit and switch signals in both directions. For the purpose of this description, modules 14A and 14B may be considered second stage modules, and modules 16A and 16B third-stage modules. Module 12 may be termed a first stage module. Modules 14B and 16B initially serve as standby to modules 14A and 16A respectively. However, when the standby unit is activated, it becomes the working unit and the other becomes the standby (once replaced and operating again). Module 14B is normally switched to receive input from path 13C from module 12, and apply its output to the disconnected inputs of modules 16A and 16B over the respective paths 15E and 15G. Module 14B is also connected to apply an output on path 13D to the disconnected output of module 12. Module 14B further receives an input over path 15F to its normally connected input and a input from path 15H to an normally disconnected input.

Path 15C connects an output of module 14A to the normally connected input of module 16B, while the path 15D connects an output of module 16B to the normally disconnected input of module 14A.

Modules 14A, 14B 16A and 16B each include fault detection circuitry for detecting the occurrence of errors or fault conditions in the circuitry. This circuitry is shown as the dashed line box with the "F" label and produces fault signals "F" that are output from the modules. Controller/monitor circuit 20 monitors the errors or fault signals generated by modules 14A, 14B, 16A and 16B carried over one or more lines from the modules to the controller/monitor circuit 20.

Figure 2:
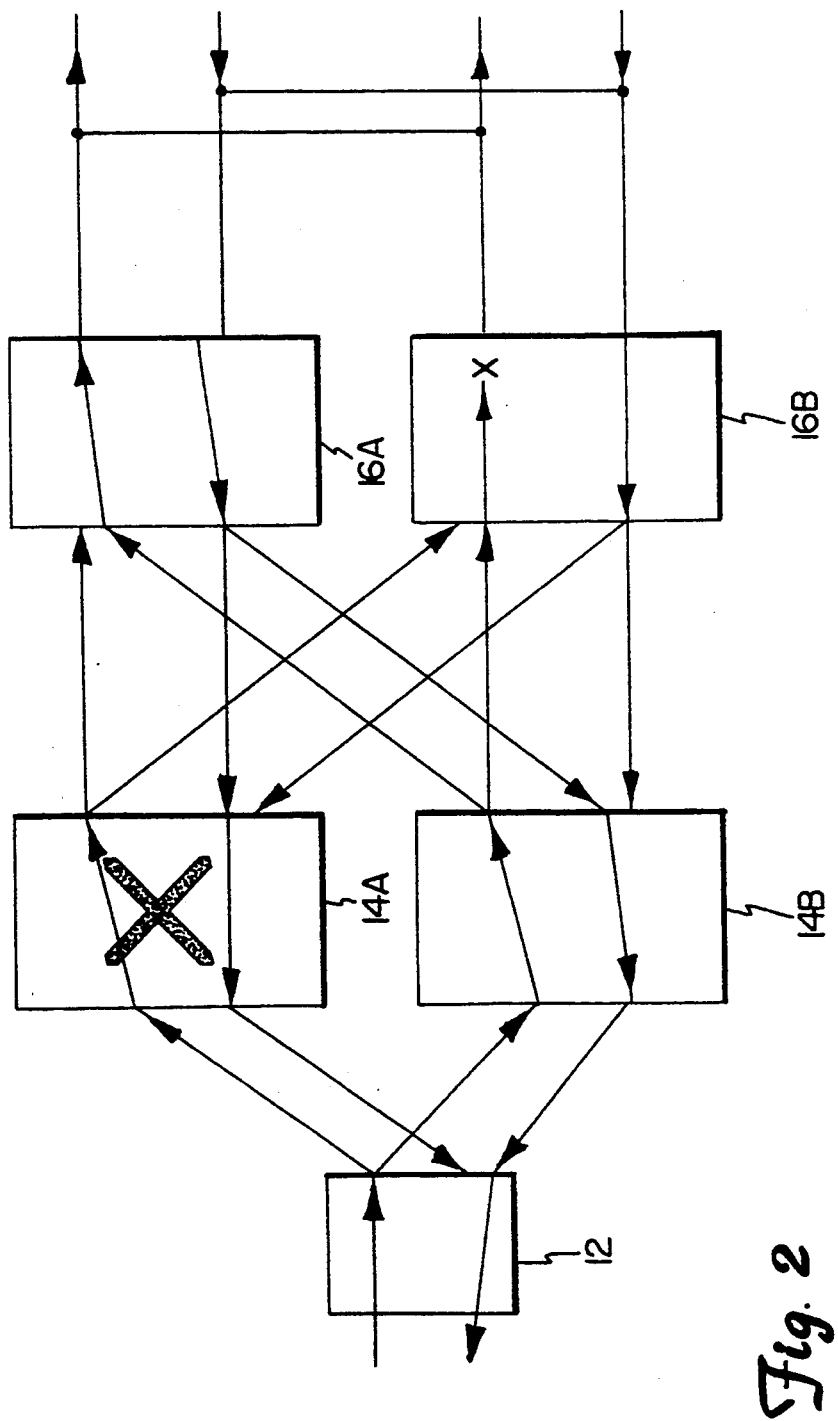
FIG. 2 is a simplified block diagram of one failure mode and corresponding protection switching operation, according to the present invention.

In the event a fault condition is detected in a working module 14A, controller/monitor circuit 20 sends a control signal "C" to the control input "C" of module 14B. A switching control circuit shown as a dashed line box with the label "C" in module 14B then controls the switching of module 12 and module 16A and 16B to the "standby" positions. The control of modules 12 and 16A and 16B is diagrammatically illustrated by control line 30. FIG. 2 illustrates the position of the various switches and signal paths after module 14B is switched into operation and module 14A is disabled.

Figure 3:
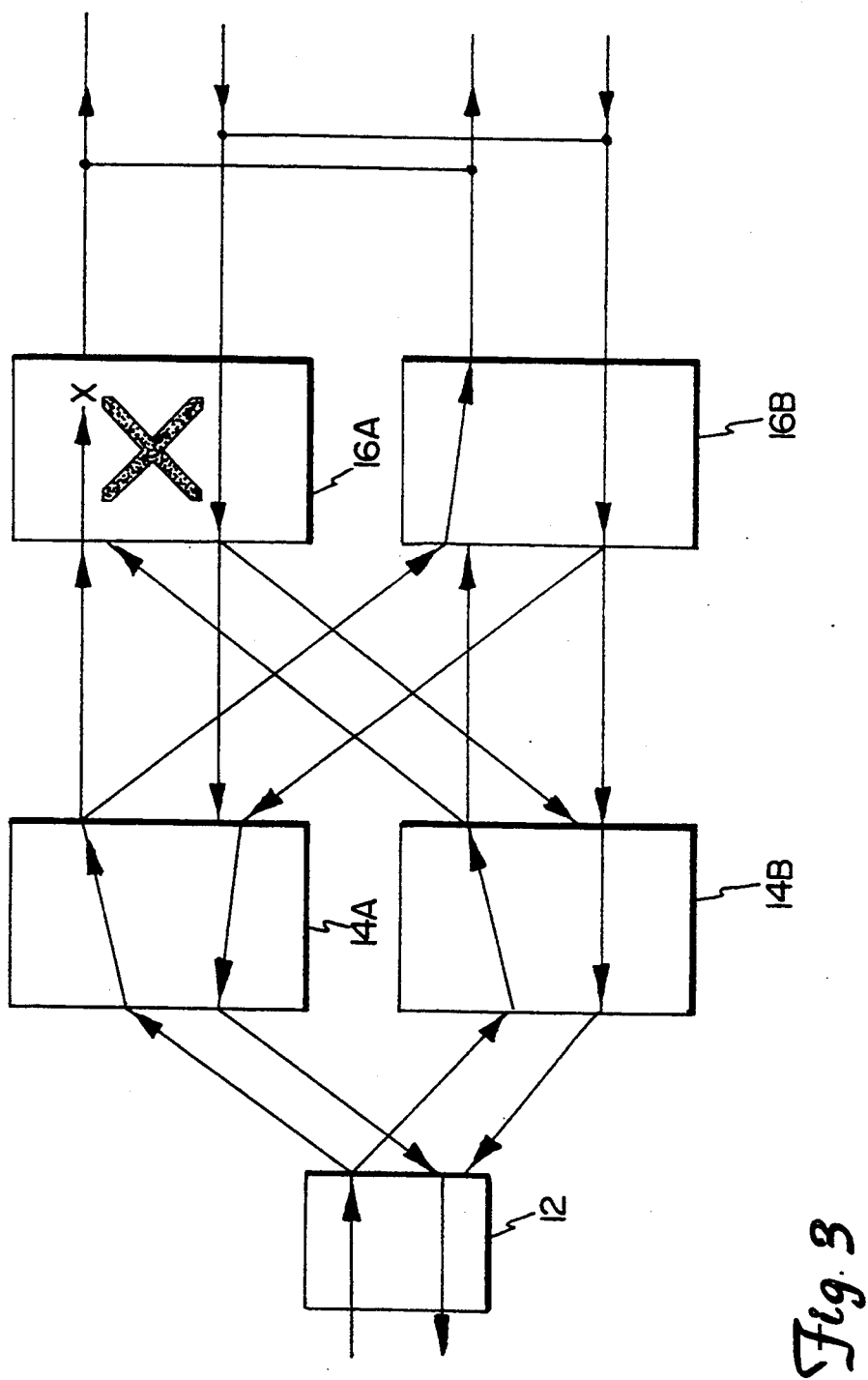
FIG. 3 is a simplified block diagram of another failure mode and the corresponding protection switching, according to the present invention.

In the event that controller/monitor 20 detects an error or fault condition in a working module 16A, it sends a control signal to standby module 16B (also having a switching control circuit), which in turn, using control line 40, switches modules 14A and 14B to provide the configuration shown in FIG. 3. Module 16B thus becomes the working module, and 16A the standby. In normal operation, the output of module 16B is disconnected, such that it does not produce an active output signal on path 17C. Upon the receipt of a control signal for monitor/controller 20, the inputs and outputs of module 16B are switched to provide an active output on output 17C. All modules in the system are normally operating to switch or process signals. Thus, if modules 14A and 14B are fully operational and receiving the same signals, they are producing identical output signals. The same is true for modules 16A and 16B. This allows the operation of the modules to be compared to one another to determine if a fault condition has occurred in one. Also, it allows switching to occur substantially instantaneously, as only the inputs need be switched to take signal from a different module. Thus, to reiterate, when changing configurations, only the inputs of modules 12, 14A, 14B, 16A or 16B are switched, and the outputs of 16A and 16B are enabled or connected, as the case may be.

When module 14B or 16B is the working module, it also controls switching back to the other module in the pair, and the associated input switches, reverse of the switching described above. If a module 14B or 16B is removed or disabled, switching automatically defaults to inputs applied to modules 14A or 16A, as the case may be.

Thus, as described above, the present invention provides a system wherein the standby module 14B or 16B, once activated, controls the switching of other modules receiving signals from the standby module to reconfigure as necessary to obtain swift standby operation, so that telephone service is not noticeably interrupted.

As it shall be readily appreciated, system 10 can be extended to include additional source, upstream and/or downstream modules.

What is claimed:

1. A protection switching system, comprising:
   a first stage module having an input and output;
   a pair of second stage modules, each second stage module having an input and output for connection to the first stage module for transmission and reception of signals therebetween, one of said second stage modules being a working module, the other of said second stage modules being a standby module;
   a pair of third stage modules, each third stage module having an input and output for connection to an input and output of each of said second stage modules for transmission and reception of signals therebetween, one of said third stage modules being a working module, the other of said third stage modules being a standby module;
   a controller/monitor circuit to monitor fault conditions of the working modules and to issue a control signal upon detection of a fault condition in a working module to cause at least one of the standby modules of the second and third stage standby modules to function in place of the working module in which a fault condition is detected; and
   the at least one standby module of the second and third stage standby modules includes means for switching the inputs of the first stage module, standby modules, and working modules, to a standby position corresponding to an activation of the at least one standby module.

* * * * *